Patented Nov. 5, 1940

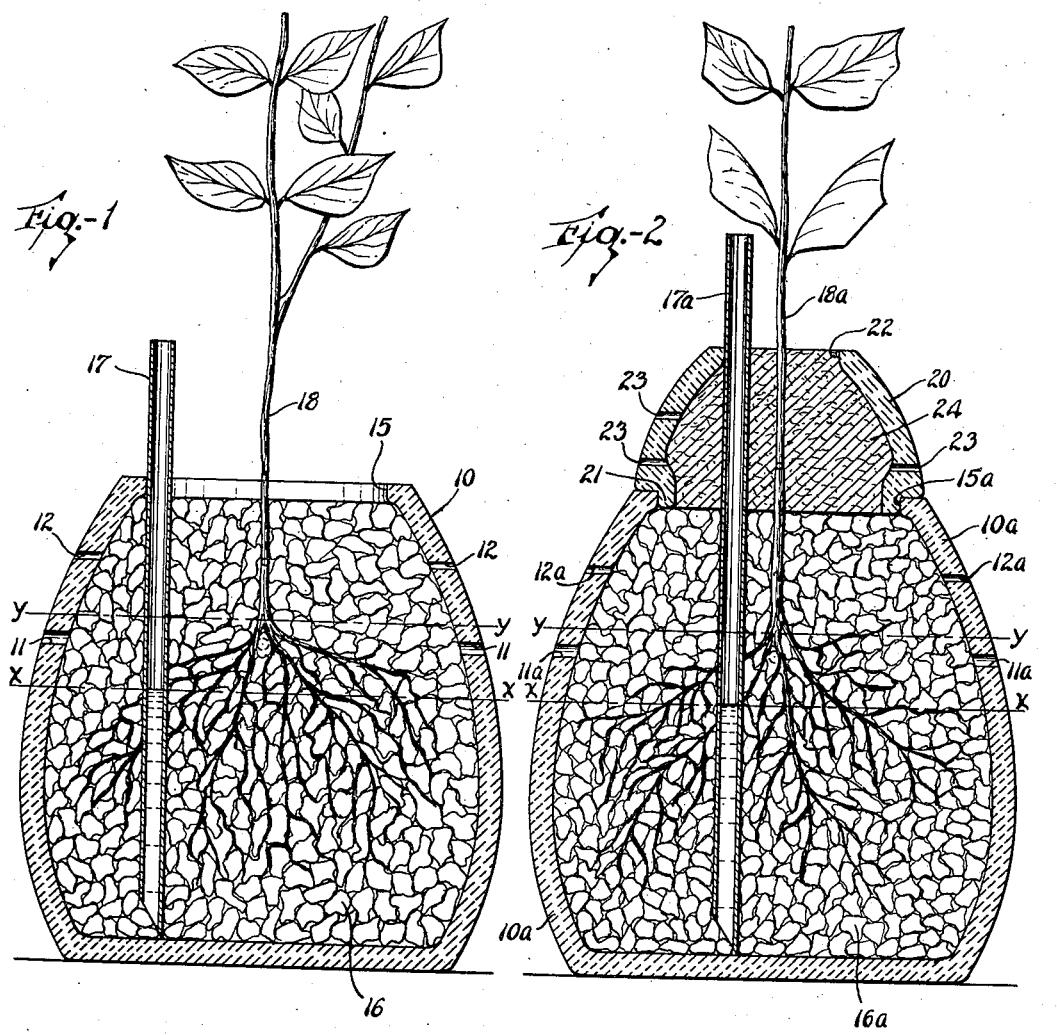

2,220,497

UNITED STATES PATENT OFFICE 2,220,497

POT FOR PLANT PROPAGATION

Andrew S. Robinson, Akron, Ohio

Application August 4, 1939, Serial No. 288,269

6 Claims. (Cl. 47—1.2)

The invention relates to pots, receptacles, or containers for growing plants, and more especially it relates to pots or the like adapted for the propagation of plants through the agency of water culture.

All plant life is dependent upon nutrition, ventilation and circulation. The chemical elements necessary to plant growth normally are supplied by air and water, and by certain soluble mineral salts that are present in varying degree in the soil. The mineral salts required by different plants may differ in character and/or quantity, and soils in different geographic regions frequently differ in their plant-nutrient value. The desirability of determining which chemical salts promote optimum growth of the various plants, and the preferred proportions of said salts, has given rise to water culture by means of which plants are propagated without the presence of soil, the necessary chemical salts being supplied by an aqueous culture medium.

Because the equipment required for successful water culture was of a special nature and not readily available to laymen, water culture heretofore has been confined chiefly to scientific laboratories. Thus its advantages as a means for improving crops and plant life, and its interest and delights as a hobby for amateur horticulturists have long been practically unavailable, chiefly because of the lack of the necessary equipment at a price within reason.

Science has determined which chemical elements are necessary or desirable for stimulating plant growth, and literature on this phase of the subject is available to interested persons. Therefore, further discussion of the chemical phase of the subject is unnecessary except to note that iron, an essential element in nutrient solutions, reacts readily with other elements and forms an insoluble precipitate, thus making it unavailable to a plant, and heretofore requiring frequent replenishing.

This invention then, is directed chiefly to the feature of providing the necessary ventilation and circulation about the roots of plants propagated by means of water culture. The invention is chiefly of a mechanical nature and consists of an improved pot or receptacle for the reception of a plant and the culture medium for nourishing the same, the receptacle also containing coarse granular material that provides mechanical support for the roots and stem of a plant, and which preferably is normally impregnated with at least one chemical salt having plant-nutrient properties.

The chief objects of the invention are to provide an improved pot or receptacle for water culture practice; to provide a pot of the character mentioned that will enable the necessary ventilation to the root portion of a plant; that readily may be provided with water culture media in proper proportion; that is so constructed as to prevent drowning of a plant from an excess of the aqueous culture medium, such as may occur from the addition of too much fluid, or from rain when the pot is situated out of doors; that is so constructed as to reduce the dilution of the culture medium from rain, and also reduce evaporation of the said medium in warm weather; that enables the propagation of plants from seeds, thus obviating transplanting; and that provides a siphon means for changing the aqueous culture solution, changing the liquid level thereof, and for obtaining samples thereof for analysis, without requiring the moving of the pot or container. Other objects will be manifest as the description proceeds.

Of the accompanying drawing:

Figure 1 is a vertical section through a pot constituting one embodiment of the invention, and a plant and an aqueous culture medium therein; and Figure 2 is a similar section of another embodiment of the invention.

Referring first to Fig. 1 of the drawing, there is shown a pot or receptacle 10, which pot is composed of ceramic material that is baked and glazed to render it water-proof and non-absorbent. The pot 10 is relatively large at its base and relatively small at the top, the opening 15 in the top being about one-half the diameter of the base. The base of the pot is imperforate, but the side wall thereof is formed with about four radial apertures 11, 11 each about ¼ inch diameter, said apertures being equally spaced about the pot in a plane located at two-thirds the height of the pot. The apertures 11 control the liquid level of the aqueous culture solution, and serve to ventilate the roots of the plant when said liquid level is below them. Between the plane of the apertures 11 and the top of the pot the wall of the latter is formed with four more equally spaced radial apertures 12, 12 that may be smaller than apertures 11 (about ⅛ inch diameter) and which function solely for ventilating purposes.

Within the pot or container 10 is a quantity of coarse granular material 16 of approximately ½ inch mesh in unit size, and supported by said granular material is a tube 17 that extends from the bottom of the pot to a point above the top thereof. The granular material preferably is composed of burnt clay, which ordinarily comprises at least one of the salts of iron therein. This iron is in a form that is available to plant life and constitutes a culture medium. Of course if the particular iron salt or salts is not desired as a culture medium, or if it is desired to supply the iron in a different manner, granular material other than burnt clay may be employed, for example, pebbles or cinders. The tube 17 may be composed of copper, tin, porcelain or glass since these materials are not deleteriously affected by the aqueous culture media usually employed in water culture. The tube is of sufficient size to admit the insertion of a smaller tube thereinto for the purpose of syphoning off the aqueous culture medium for the purpose of testing the same, for changing the fluid, or for changing the liquid level thereof, which operations may be effected in situ, without moving the container.

In propagating plants from seeds with the equipment described, the pot 10 is filled with the granular material 16 to a planting level indicated by the line y—y. The seed is placed upon the granular material at this level, after which more granular material is added sufficient to lightly cover the seed. The aqueous culture solution is then added until it reaches the level of the drain holes 11, the preferred proportion being about one gallon of solution to two gallons of granular material. The granular material above the liquid level is moistened by the culture medium by reason of capillary attraction, thereby providing the moisture necessary for germination of the seed. As the plant grows, additional granular material may be placed about the stem thereof until the pot is completely filled. This condition is shown in Fig. 1 of the drawing wherein the plant as a whole is designated by the numeral 18. After the plant starts growing and sends down roots, the liquid level of the aqueous culture medium is lowered to the level indicated by the line x—x. This may be accomplished by evaporation of the liquid, or by withdrawal through the agency of the tube 17. Of course when growing plants are transplanted to the improved container the liquid level of the culture medium is initially at the line x—x, and thereafter is maintained at this level.

The improved pot is admirably suited for outdoor use since its relatively large base assures stability even in stiff wind, and its relatively small top opening reduces dilution of the culture medium from heavy rains, and also reduces evaporation of the culture medium in hot weather. The invention makes possible the practice of water culture from seeds without the requirement of transplanting, it prevents drowning of the plant from too high a level of the aqueous culture medium such as might occur from too much rain or the addition of too much liquid, and it achieves the other advantages set out in the foregoing statement of objects.

The embodiment of the invention shown in Fig. 2 of the drawing includes all of the elements of the structure shown in Fig. 1, which elements are designated by the same numerals with the exponent a added. In addition the structure shown in Fig. 2 comprises a dome-shaped cap 20 that rests upon the top of the pot 10a and has its bottom formed with a circumferential flange 21 that is received within the opening 15a of the pot to prevent the cap from being readily dislodged from the pot. The top of the cap is formed with an opening 22 that is about half the size of the opening 15a of the pot, and the plant stem 18a and the tube 17a project from said opening 22, the tube 17a being somewhat longer than the tube 17 for this reason. The cap 20 is formed with a plurality of radial apertures 23, 23 for ventilating purposes, which apertures may be the same size as the apertures 12a, and as shown are seven in number arranged in two different horizontal planes. The cap is packed with rock wool or glass wool 24 that provides lateral support for the plant stem 18a and tube 17a, and retards the passage therethrough of water, such as rain, that may enter through the upper opening 22 of the cap. Said packing however, does not seriously retard the circulation of air about the plant stem, which air enters the cap through the apertures 23 therein.

Other modification may be resorted to without departing from the spirit of the invention, or the scope thereof as defined by the appended claims.

What is claimed is:

1. A pot for the propagation of plants in a fluent nutrient solution, said pot comprising a body structure having a relatively large flat bottom and formed with a relatively small opening at its top, and formed intermediate its top and bottom with relatively small radially extending apertures arranged in a horizontal plane for limiting the height of the liquid level of nutrient solution therein, said pot having but a single chamber for the reception of the solution and a plant with roots extending into the latter.

2. A pot of the character described comprising a body structure having a relatively large flat bottom and having a relatively small axial opening at the top thereof, and formed intermediate its top and bottom with relatively small radial apertures arranged in a horizontal plane for controlling the height limit of nutrient solution therein, and a plurality of relatively small radial apertures disposed between the aforementioned apertures and the top of the pot for ventilating the roots of a plant in the pot, said pot having but a single chamber for the nutrient solution and a plant with roots extending into said solution.

3. A pot of the character described comprising a body structure having a relatively large flat bottom and having an axial opening at the top thereof, and being formed with radial apertures intermediate its top and bottom, and a cap for the upper opening of said body structure, said cap being formed with a relatively small axial opening to enable a plant to extend therethrough.

4. A combination as defined in claim 3 in which the cap is a hollow dome-shaped structure, and including a packing of mineral wool in said cap.

5. A pot of the character described comprising a body structure having an axial opening in the top thereof, a hollow dome-shaped cap fitting over said body opening and formed with a relatively small axial opening to enable a plant to extend therethrough, and formed with a plurality of smaller radially extending openings for ventilating the roots of a plant within said pot, and a packing of mineral wool in said cap.

6. A pot of the character described comprising a body structure having a relatively large flat bottom and having an axial opening at the top thereof, and formed intermediate its top and bottom with relatively small radial apertures arranged in a horizontal plane for controlling the height limit of aqueous culture medium in said pot, and formed with a plurality of relatively small radial apertures disposed between the aforementioned apertures and the top of the pot for ventilating the interior of the pot, a hollow dome-shaped cap fitting over the axial opening in the said body structure and formed with a relatively small axial opening to enable a plant to extend therethrough, and formed with a plurality of smaller radially extending openings for ventilating purposes, and a packing of mineral wool in said cap.

ANDREW S. ROBINSON.